(12) United States Patent
Ko (10) Patent No.: US 10,362,211 B1
(45) Date of Patent: Jul. 23, 2019

(54) ELECTRONIC DEVICE AND METHOD OF SWITCHING A CAMERA MODULE

(71) Applicant: Acer Incorporated, New Taipei (TW)

(72) Inventor: Chueh-Pin Ko, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/928,251

(22) Filed: Mar. 22, 2018

(30) Foreign Application Priority Data

Jan. 11, 2018 (TW) .............................. 107101061 A (51) Int. Cl.
  *G06F 3/042* (2006.01)
  *H04N 5/232* (2006.01)
(52) U.S. Cl.
  CPC ............. *H04N 5/232* (2013.01); *G06F 3/042* (2013.01); *G06F 2203/04101* (2013.01)
(58) Field of Classification Search
  CPC .... H04N 5/232; H04N 5/23241; G06F 3/042; G06F 2203/04101
  See application file for complete search history.

(56) References Cited

U.S. PATENT DOCUMENTS

| 5,943,521 A | 8/1999 | Lamphron et al. | |
| 2007/0002846 A1* | 1/2007 | Rada | H01Q 3/30 370/358 |
| 2008/0078590 A1 | 4/2008 | Sequine | |
| 2008/0130835 A1* | 6/2008 | Peterson | A61B 6/4464 378/117 |
| 2013/0100020 A1* | 4/2013 | Salsman | G06F 3/042 345/158 |
| 2018/0262545 A1* | 9/2018 | Alexander | F21L 4/005 |

FOREIGN PATENT DOCUMENTS

CN 1100587634 A 2/2010

OTHER PUBLICATIONS

Chinese language office action dated Aug. 3, 2018, issued in application No. TW 107101061.

* cited by examiner

*Primary Examiner* — Hung H Lam
(74) *Attorney, Agent, or Firm* — McClure, Qualey & Rodack, LLP (57) ABSTRACT

An electronic device includes a camera module, a first capacitive sensing element, a monitoring circuit, and a blocking module. The monitoring circuit is electrically connected to the first capacitive sensing element and the camera module. The blocking module includes a moving member and a first conductive element. The moving member moves relative to the camera module. The first conductive element is disposed on the moving member. When the moving member is located in a first position, the first capacitive sensing element senses the first conductive element, so as to generate a sensing signal. The monitoring circuit enables the camera module according to the sensing signal. When the moving member is located in a second position and the first capacitive sensing element does not sense the first conductive element, the monitoring circuit turns off the camera module.

17 Claims, 11 Drawing Sheets

ELECTRONIC DEVICE AND METHOD OF SWITCHING A CAMERA MODULE

CROSS REFERENCE TO RELATED APPLICATIONS

This application claims priority of Taiwan Patent Application No. 107101061, filed Jan. 11, 2018, the entirety of which is incorporated by reference herein.

BACKGROUND OF THE DISCLOSURE

Field of the Disclosure

The present disclosure relates to an electronic device, and more particularly to an electronic device having a blocking module for blocking a camera module.

Description of the Related Art

As technology has progressed, many kinds of electronic devices such as smartphones have begun to include the functionality of digital photography or video recording. A user can use the electronic device to capture various images using the camera module of the electronic device.

However, today's society pays more and more attention to personal privacy, but a camera module of an electronic device has a risk of exposing personal privacy. For example, a hacker may illegally or irregularly hack into a user's electronic device, and the user's normal behavior may be seen or recorded without the user's awareness. Therefore, to reduce this risk, many users may use a patch, a piece of black tape, or another attachable blocking object to physically block the lens of the camera module, so as to prevent the lens of the camera module from capturing images or recording video. However, these solutions give the electronic device a bad appearance, and the blocking object cannot be easily detached from or installed on the electronic device.

Therefore, how to effectively block the camera module of the electronic device to prevent a hacker from hacking into the electronic device and viewing through the camera module are topics nowadays that need to be discussed and solved.

BRIEF SUMMARY OF THE DISCLOSURE

Accordingly, one objective of the present disclosure is to provide an electronic device, so as to solve the above problems.

According to some embodiments of the disclosure, an electronic device is provided to include a camera module, a first capacitive sensing element, a monitoring circuit, and a blocking module. The monitoring circuit is electrically connected to the first capacitive sensing element and the camera module. The blocking module includes a moving member and a first conductive element. The moving member moves relative to the camera module. The first conductive element is disposed on the moving member. When the moving member is located in a first position, the first capacitive sensing element senses the first conductive element and generates a sensing signal. The monitoring circuit enables the camera module according to the sensing signal. When the moving member is located in a second position and the first capacitive sensing element does not sense the first conductive element, the monitoring circuit turns off the camera module.

In some embodiments, the blocking module further includes a base, the base includes a sliding slot, and the moving member moves relative to the base along the sliding slot.

In some embodiments, the base further includes an opening which is aligned with a lens of the camera module, and when the moving member is located in the second position, the moving member blocks the opening.

In some embodiments, the electronic device further includes a front covering plate and a flexible printed circuit board. The front covering plate is located between the camera module and the blocking module. The flexible printed circuit board is disposed on the front covering plate, and the first capacitive sensing element is disposed on the flexible printed circuit board.

In some embodiments, the electronic device further includes a front covering plate, and the base includes an opening slot, wherein the moving member moves along the opening slot, and the first conductive element is located between the moving member and the front covering plate.

In some embodiments, the first capacitive sensing element is disposed on the camera module.

In some embodiments, the electronic device further includes a conducting layer, disposed on the front covering plate, and the first capacitive sensing element is disposed in the conducting layer.

In some embodiments, the electronic device further includes a second capacitive sensing element, and the blocking module further includes a second conductive element corresponding to the second capacitive sensing element. The second capacitive sensing element senses the second conductive element and outputs a sensing value, and the monitoring circuit determines whether the second capacitive sensing element is aligned with the second conductive element according to the sensing value.

In some embodiments, the blocking module further includes a base, each of the second conductive element and the second capacitive sensing element has a rectangular structure, and the second conductive element is disposed on a long side of a bottom of the base.

In some embodiments, the blocking module further includes a base, the second conductive element and the second capacitive sensing element respectively has a rectangular structure, and the second conductive element is disposed on a short side of a bottom of the base.

In some embodiments, the blocking module further includes a base, and each of the second conductive element and the second capacitive sensing element has a U-shaped structure which corresponds to a shape of the base.

In some embodiments, the moving member includes a first end portion, a connecting portion and a second end portion, the connecting portion is connected between the first end portion and the second end portion, and the first conductive element is disposed on a bottom of the second end portion.

In some embodiments, the blocking module includes a thickness, and the thickness is substantially equal to 2 mm or is less than 2 mm.

In some embodiments, the electronic device further includes a storage circuit, and the monitoring circuit executes an application stored in the storage circuit according to the sensing signal.

According to some embodiments of the disclosure, a method of switching a camera module includes: disposing a blocking module on the camera module of an electronic device; sensing, by a first capacitive sensing element, a first conductive element on a moving member of the blocking module, so as to generate a sensing signal; determining, by a monitoring circuit, whether the moving member is located in a first position according to the sensing signal; providing, by the electronic device, electricity to enable the camera module when the moving member is located in the first position; and stopping providing electricity by the electronic device to turn off the camera module when the moving member is located in a second position; wherein when the moving member is located in the second position, the moving member blocks a lens of the camera module.

In some embodiments, the method further includes: sensing, by a second capacitive sensing element, a second conductive element on the blocking module to output a sensing value when the blocking module is disposed on the camera module; determining, by the monitoring circuit, whether the blocking module is aligned with the camera module according to the sensing value; and controlling, by the monitoring circuit, the electronic device to generate a notification message when the monitoring circuit determines that the blocking module is not aligned with the camera module.

In contrast to the prior art, the present disclosure provides an electronic device which includes a detachable blocking module, and the user can install the blocking module on the camera module of the electronic device. The monitoring circuit can determine whether the moving member of the blocking module blocks the lens of the camera module according to the sensing signal outputted from the first capacitive sensing element when the first capacitive sensing element senses the first conductive element, so as to determine whether to provide the camera module with electricity to enable the camera module or to stop providing electricity to turn off the camera module.

In addition, the monitoring circuit can further determine whether the blocking module is aligned with the camera module according to the sensing value outputted from the second capacitive sensing element when the second capacitive sensing element senses the second conductive element. When the blocking module is not aligned with the camera module, the monitoring circuit can control the display screen to display a notification message to notify the user about the installation of the blocking module again, so that the blocking module can be aligned with the camera module. As a result, the monitoring circuit can more accurately monitor the position of the moving member.

Therefore, the electronic device having a blocking module can not only solve the problem of hackers hacking into the electronic device and peeping through the camera module, but also has the advantage of saving power. In addition, because the first capacitive sensing element and the second capacitive sensing element can be formed together in the touch layer during the manufacturing of the touch panel, the electronic device also has the advantages of reducing the manufacturing cost and simplifying the manufacturing process.

DETAILED DESCRIPTION OF THE ILLUSTRATIVE EMBODIMENTS

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that component for specific description or specific figures can be present in any forms with which the skilled person is familiar. In addition, when a layer is "above" other layers or a substrate, it might be "directly" on the layers or the substrate, or some other layers are between the layer and other layers.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 1:
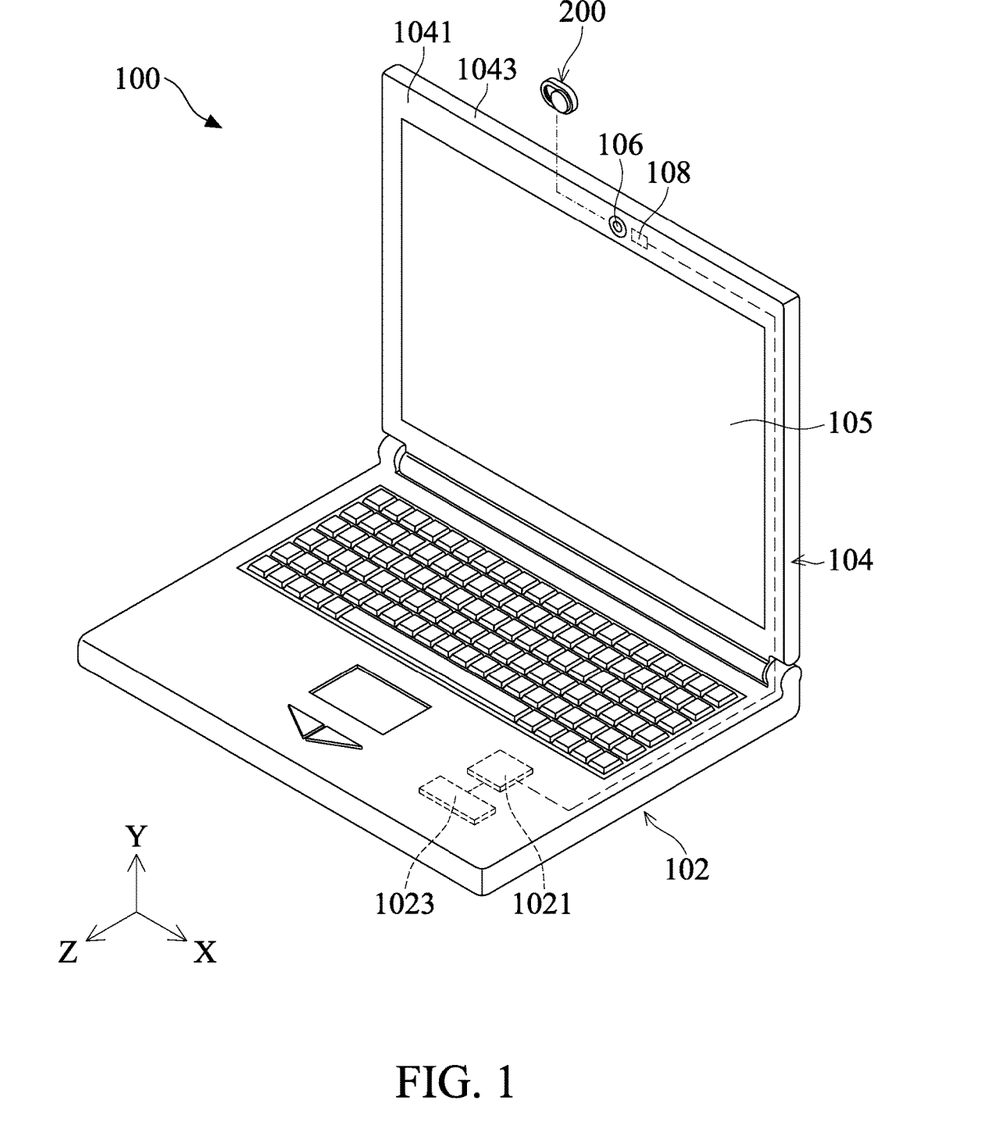
FIG. 1 shows a schematic diagram of an electronic device according to an embodiment of the present disclosure.

Please refer to FIG. 1, which shows a schematic diagram of an electronic device 100 according to an embodiment of the present disclosure. As shown in FIG. 1, the electronic device 100 can be a notebook computer, but it is not limited to this embodiment. That is, the electronic device 100 can be any electronic device having a camera module, including but not limited to a handheld computer, a tablet computer, a mobile computer, a smartphone, a personal digital assistant (PDA), electronics at the point of sale (EPOS or POS), or the like, including a combination of two or more of these items.

As shown in FIG. 1, the electronic device 100 includes a host module 102 and a display module 104. In this embodiment, the display module 104 can rotate relative to the host module 102. In addition, the display module 104 can include a front covering plate (or can be called a "B member") 1041, a rear covering plate 1043, a display screen 105, a camera module 106 and a first capacitive sensing element 108. The front covering plate 1041 is connected to the rear covering plate 1043, and the display screen 105, the camera module 106 and the first capacitive sensing element 108 are accommodated between the front covering plate 1041 and the rear covering plate 1043. In other embodiments, the display screen 105 and the front covering plate 1041 can be integrally formed in one piece, such as a touch panel.

In addition, the host module 102 can include a monitoring circuit 1021 and a storage circuit 1023. The monitoring circuit 1021 can be a micro-processor or a central processor, configured to control operations of the electronic device 100. The monitoring circuit 1021 provides the processing capability required to execute an operating system, programs, user graphic interface (GUI), software, modules, application, and other functions of the electronic device 100. The monitoring circuit 1021 may include a single processor or it may include a plurality of processors. For example, the monitoring circuit 1021 may include general purpose microprocessors, a combination of general and special purpose microprocessors, such as instruction-set processors, graphics processors, video processors, audio processors and special purpose microprocessors.

Data used by the monitoring circuit 1021 are stored in the storage circuit 1023. The storage circuit 1023 may be non-volatile memory such as read only memory, flash memory, a hard drive, or any other suitable optical, magnetic, or solid-state computer readable media, as well as a combination thereof. It should be understood that the electronic device 100 is only one example of the electronic device of the present disclosure. The electronic device 100 can have more or less components in the figures, or has a different configuration of components.

The storage circuit 1023 can store an operation system for being performed by the electronic device 100. These operation systems can include Android, Berkeley Software Distribution (BSD), iPhone OS (iOS), Linux, OS X, Unix-like Real-time Operating System (e.g., QNX), Darwin, UNIX, Microsoft Windows, Window Phone and IBM z/OS, but they are not limited thereto. The operation system includes various software components and/or drivers for controlling and managing general system tasks (e.g., memory management, storage device control, power management, etc.) and facilitates communication between various hardware and software components. In some embodiments, a user can perform the operation system to execute one or more applications (or set of instructions) stored in the storage circuit 1023, so as to be performed by the electronic device 100.

In some embodiments of the present disclosure, the monitoring circuit 1021 can be electrically connected to the camera module 106 and the first capacitive sensing element 108, and the monitoring circuit 1021 can receive signals from the first capacitive sensing element 108 or can control operations of the camera module 106. For example, a monitoring application can be stored in the storage circuit 1023, and the monitoring circuit 1021 can execute the monitoring application to monitor the first capacitive sensing element 108 and operations of the camera module 106, such as turning it on or off.

Figure 2:
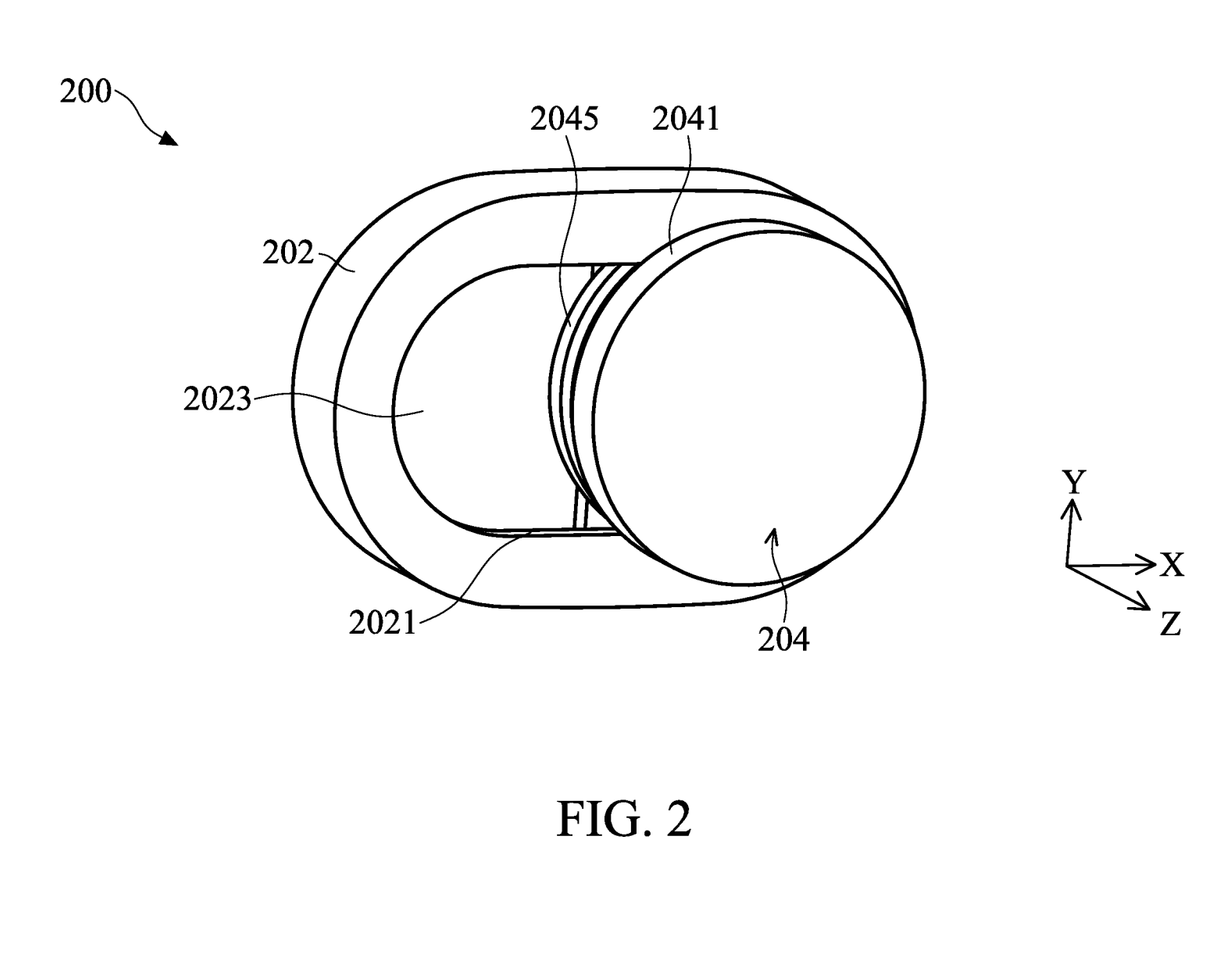
FIG. 2 shows a schematic diagram of a blocking module according to the embodiment of the present disclosure.
Figure 3:
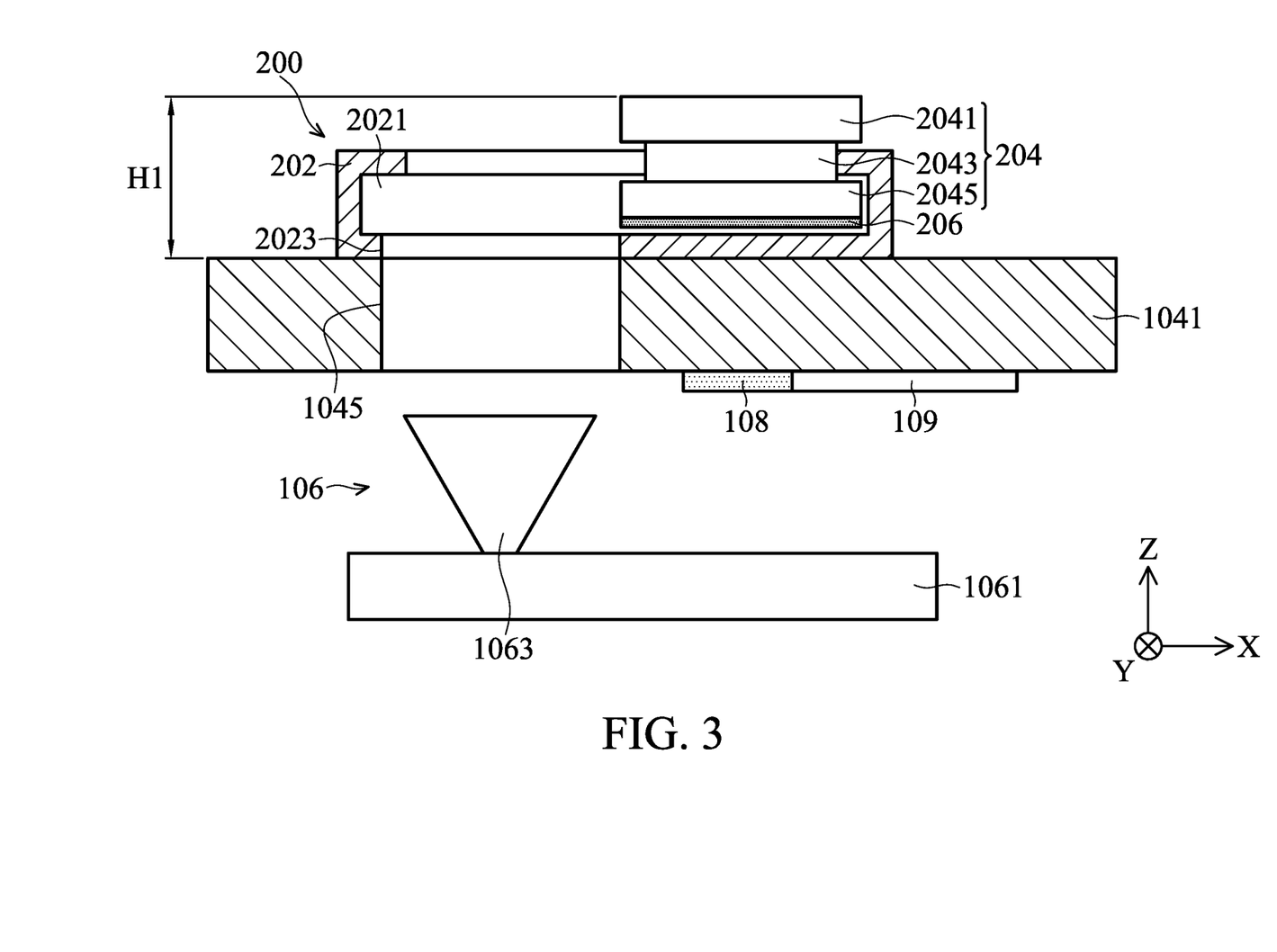
FIG. 3 shows a sectional view of the blocking module, the camera module and the front covering plate according to the embodiment of the present disclosure.

Next, please refer to FIG. 1 to FIG. 3 together. FIG. 2 shows a schematic diagram of a blocking module 200 according to the embodiment of the present disclosure. FIG. 3 shows a sectional view of the blocking module 200, the camera module 106 and the front covering plate 1041 according to the embodiment of the present disclosure. As shown in FIG. 1, the electronic device 100 can further include a blocking module 200. The blocking module 200 is detachably disposed on the front covering plate 1041 and is aligned with the camera module 106 and the first capacitive sensing element 108. That is, the front covering plate 1041 is located between the camera module 106 and the blocking module 200, and the blocking module 200 is configured to block the lens of the camera module 106, so as to prevent a hacker from hacking the electronic device 100 and peeping through the camera module 106 to watch the user.

As shown in FIG. 2 and FIG. 3, the blocking module 200 can includes a base 202, a moving member 204 and a first conductive element 206. A sliding slot 2021 can be formed on the base 202 so that the moving member 204 can move relative to the base 202 and the camera module 106 along the sliding slot 2021, such as moving along the X-axis direction. As shown in FIG. 3, the moving member 204 can include a first end portion 2041, a connecting portion 2043 and a second end portion 2045. The connecting portion 2043 is connected between the first end portion 2041 and the second end portion 2045, and the first conductive element 206 is disposed on the bottom of the moving member 204. That is, the first conductive element 206 is disposed on the bottom of the second end portion 2045.

In some embodiments of the disclosure, the moving member 204 is made of plastic or other non-conductive materials, and the first conductive element 206 is made of a conductive material. For example, the first conductive element 206 can be made of silver, aluminum, platinum, cooper, and so on, but it is not limited thereto. Furthermore, the first conductive element 206 can be also a conductive fabric or a conductive tape. In addition, it is noted that the blocking module 200 has a thickness H1 along the Z-axis direction, and the thickness H1 is 2 mm or less than 2 mm in this embodiment so as to facilitate the user to install the blocking module 200 on the front covering plate 1041.

As shown in FIG. 3, the blocking module 200 is disposed on the front covering plate 1041. For example, the blocking module 200 is stuck to the front covering plate 1041, but the manner of disposing the blocking module 200 on the front covering plate 1041 is not limited thereto. The front covering plate 1041 is made of a plastic material and include a through hole 1045. In addition, the base 202 can further include an opening 2023, communicated with the sliding slot 2021 and the through hole 1045. Moreover, the camera module 106 can include a circuit board 1061 and a lens 1063 disposed on the circuit board 1061. As shown in FIG. 3, the lens 1063 is aligned with the through hole 1045 and the opening 2023 so that the lens 1063 can receive the light beams traveling through the opening 2023 and the through hole 1045, so as to perform the functions of capturing still images or recording video.

As shown in FIG. 3, the first capacitive sensing element 108 is disposed on an inner side of the front covering plate 1041, and when the moving member 204 is located in the rightmost position (which can be defined as a first position), the moving member 204 is aligned with the first capacitive sensing element 108. In this embodiment, the first capacitive sensing element 108 can be disposed on a flexible printed circuit board 109. For example, the flexible printed circuit board 109 is disposed on the inner side of the front covering plate 1041 and is electrically connected to the monitoring circuit 1021 so that the monitoring circuit 1021 can receive signals from the first capacitive sensing element 108 on the flexible printed circuit board 109.

When the moving member 204 is located in the first position, the first capacitive sensing element 108 senses the first conductive element 206 so as to generate a sensing signal, and the sensing signal can serve as an enable signal, such as a low logical state of digital signals. Then, the monitoring circuit 1021 enables the camera module 106 according to the enable signal, such as providing the camera module 106 with electricity. In addition, the monitoring circuit 1021 can also execute an application stored in the storage circuit 1023 according to the enable signal, such as to execute a camera application, a video-recording application, and so on.

Figure 4:
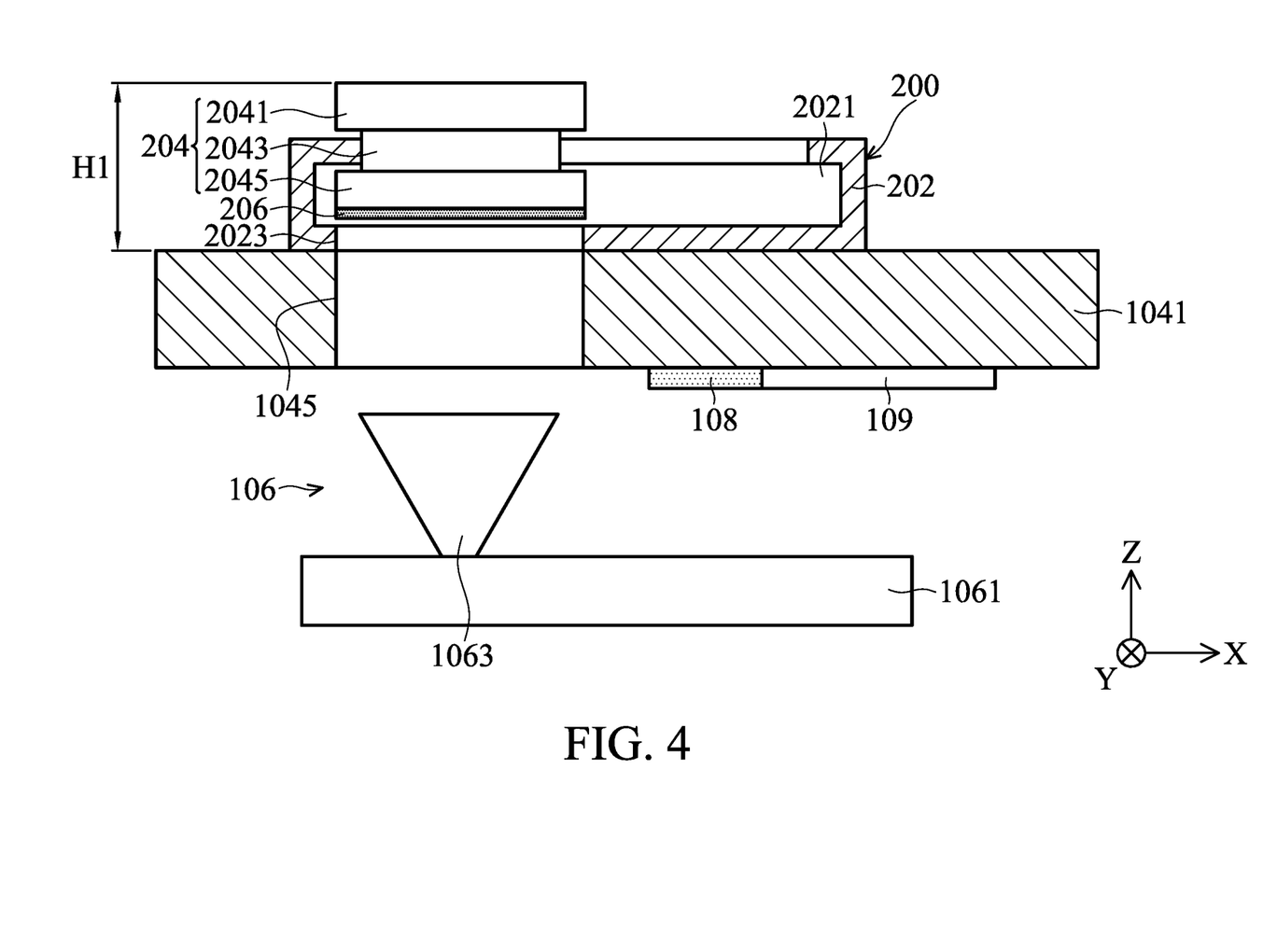
FIG. 4 is a diagram illustrating that the moving member moves from the first position in FIG. 3 to a different position according to the embodiment of the disclosure.

Please refer to FIG. 3, and FIG. 4. FIG. 4 is a diagram illustrating that the moving member 204 moves from the first position in FIG. 3 to a different position according to the embodiment of the disclosure. When the moving member 204 is forced to move from the rightmost position of the base 202 to the position shown in FIG. 4, the moving member 204 is located in the leftmost position of the base 202 (the leftmost position can be defined as a second position). At this time, the moving member 204 completely blocks the opening 2023 and the lens 1063 of the camera module 106. At this time, because the first conductive element 206 is away from the upper side of the first capacitive sensing element 108, the first capacitive sensing element 108 does not sense the first conductive element 206 and therefore the sensing signal changes. For example, the sensing signal changes from a low logical state to a high logical state of digital signals. Therefore, the monitoring circuit 1021 determines that the moving member 204 has already blocked the camera module 106 according to the sensing signal, and then the monitoring circuit 1021 can stop providing the camera module 106 with electricity, so as to turn off the camera module 106. Furthermore, when the moving member 204 is located in the second position, the monitoring circuit 1021 can also close the camera application or the video-recording application correspondingly.

It can be well known based on the above description that, in order to prevent a hacker from hacking the electronic device 100 and peeping through the camera module 106 to spy on the user, the user can stick the very thin blocking module 200 directly onto the front covering plate 1041 and then move the moving member 204 to block or reveal the camera module 106, so as to turn the camera module 106 off or on.

Figure 5:
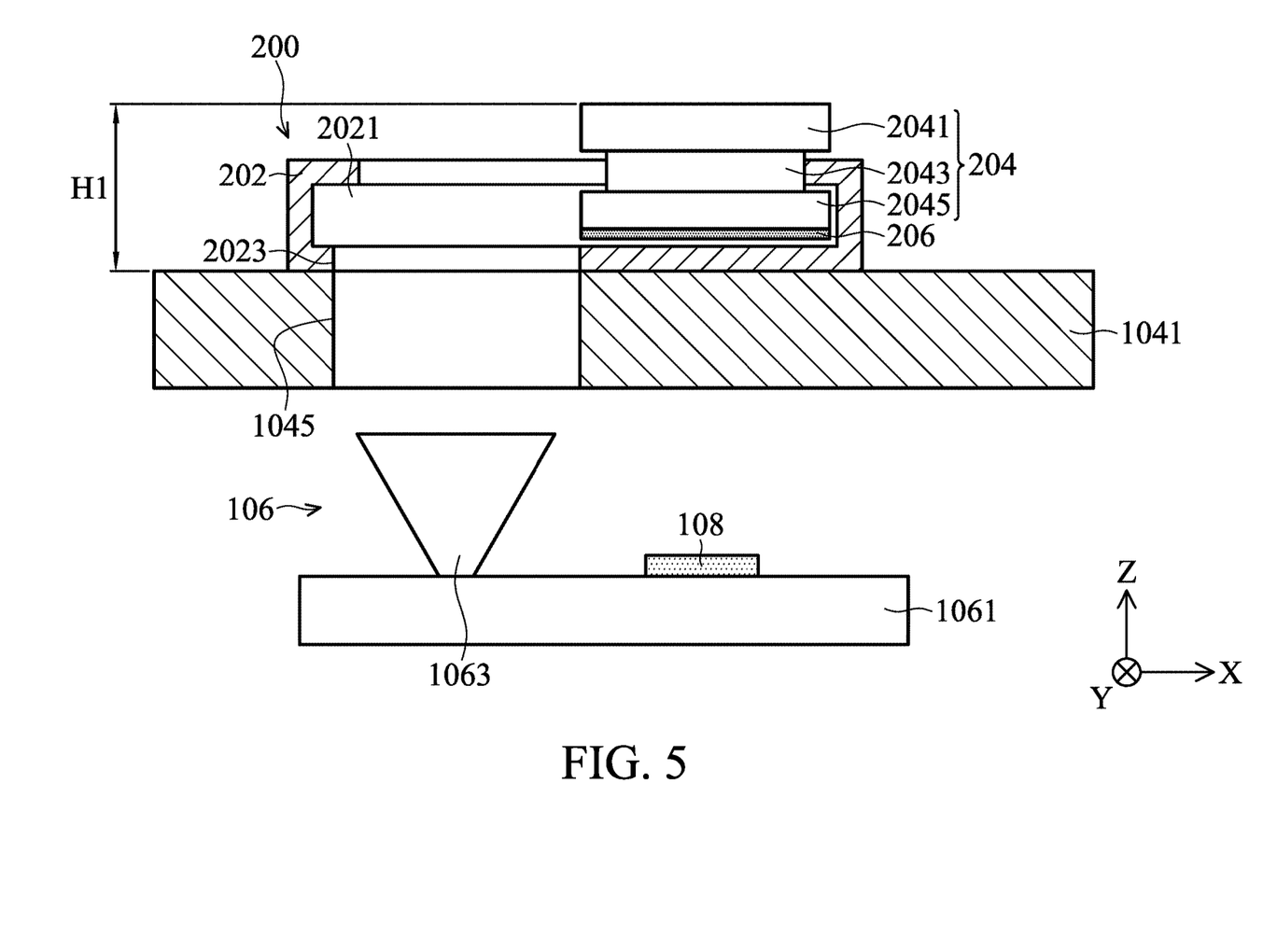
FIG. 5 shows a sectional view of the blocking module, the camera module and the front covering plate according to another embodiment of the present disclosure.

Please refer to FIG. 5, which shows a sectional view of the blocking module 200, the camera module 106 and the front covering plate 1041 according to another embodiment of the present disclosure. The structures of this embodiment are similar to the structures of the previous embodiment, and the difference is that the first capacitive sensing element 108 can be integrated in the camera module 106, such as being disposed on the circuit board 1061, and then the first capacitive sensing element 108 can be electrically connected to the monitoring circuit 1021 through the circuit lines of the circuit board 1061. Therefore, an additional flexible printed circuit board is not needed in this embodiment. As a result, not only is the manufacturing cost of the electronic device 100 reduced, but also the manufacturing process of the electronic device 100 is simplified. It should be noted that the first capacitive sensing element 108 can be disposed on the circuit board 1061 or the front covering plate 1041, and its position depends on practical design requirements. In addition, the operations of the blocking module 200 and the monitoring circuit 1021 in this embodiment are similar to the previous embodiment, and they are omitted herein.

Figure 6:
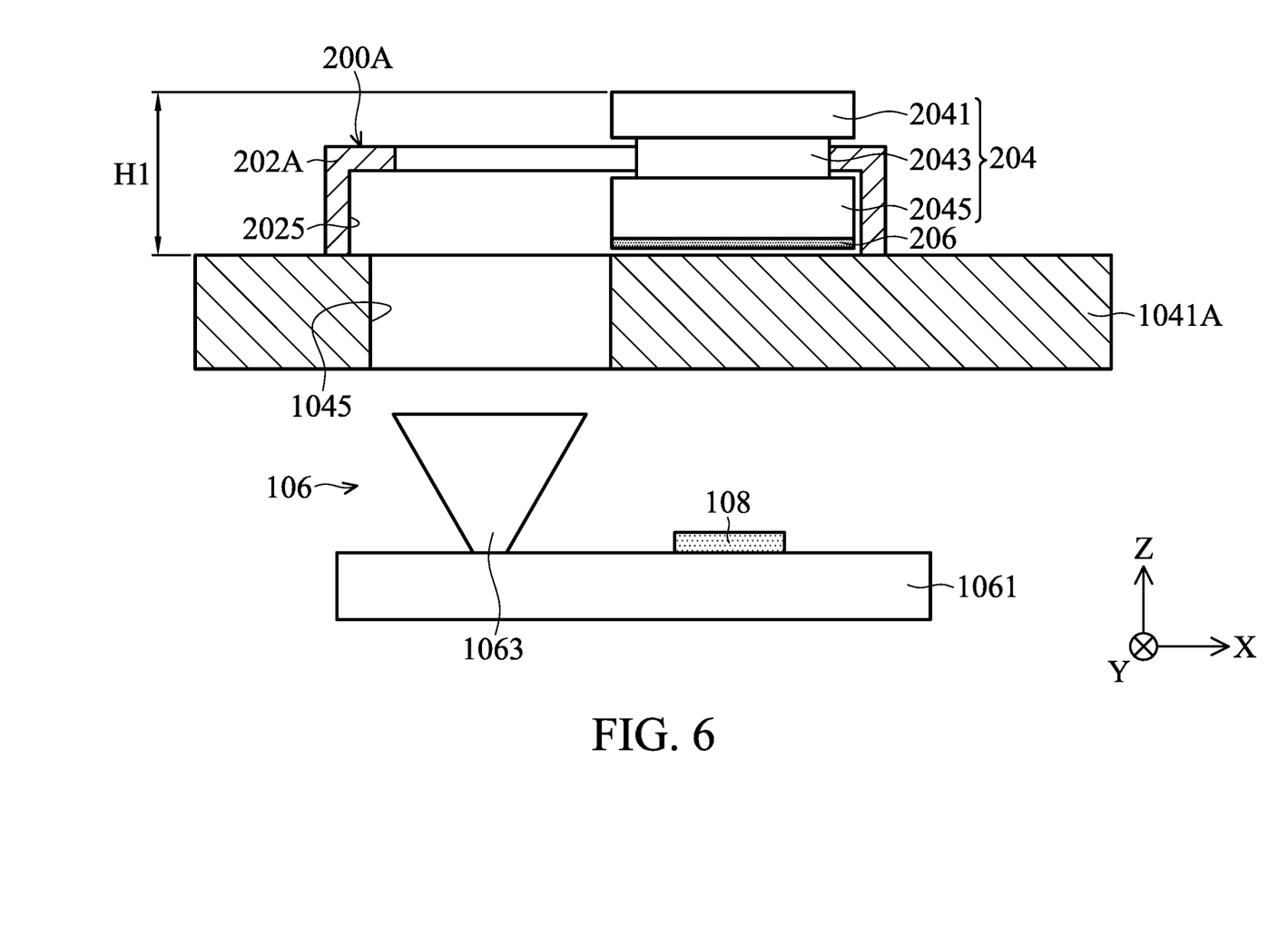
FIG. 6 shows a sectional view of a blocking module, the camera module and a front covering plate according to another embodiment of the present disclosure.

Please refer to FIG. 6, which shows a sectional view of a blocking module 200A, the camera module 106 and a front covering plate 1041A according to another embodiment of the present disclosure. In this embodiment, the front covering plate 1041A cam be made of a glass material, and a base 202A of the blocking module 200A can include an opening slot 2025. As shown in FIG. 6, the opening slot 2025 penetrates the bottom of the base 202A, and the moving member 204 moves along the opening slot 2025 relative to the base 202A and the camera module 106. In this embodiment, the first conductive element 206 is located between the moving member 204 and the front covering plate 1041A. In particular, the first conductive element 206 is located on the bottom of the second end portion 2045 of the moving member 204 and is in contact with the front covering plate 1041A. However, in other embodiments, the first conductive element 206 is not in contact with the front covering plate 1041A.

In addition, in this embodiment, the first capacitive sensing element 108 is disposed on the circuit board 1061 of the camera module 106 to be electrically connected to the monitoring circuit 1021, but it is not limited thereto. For example, in other embodiments, the first capacitive sensing element 108 can be disposed on a flexible printed circuit board similar to the embodiment of FIG. 3, and the flexible printed circuit board adheres to the inner side of the front covering plate 1041A. The position of the first capacitive sensing element 108 depends on practical design requirements.

Figure 7:
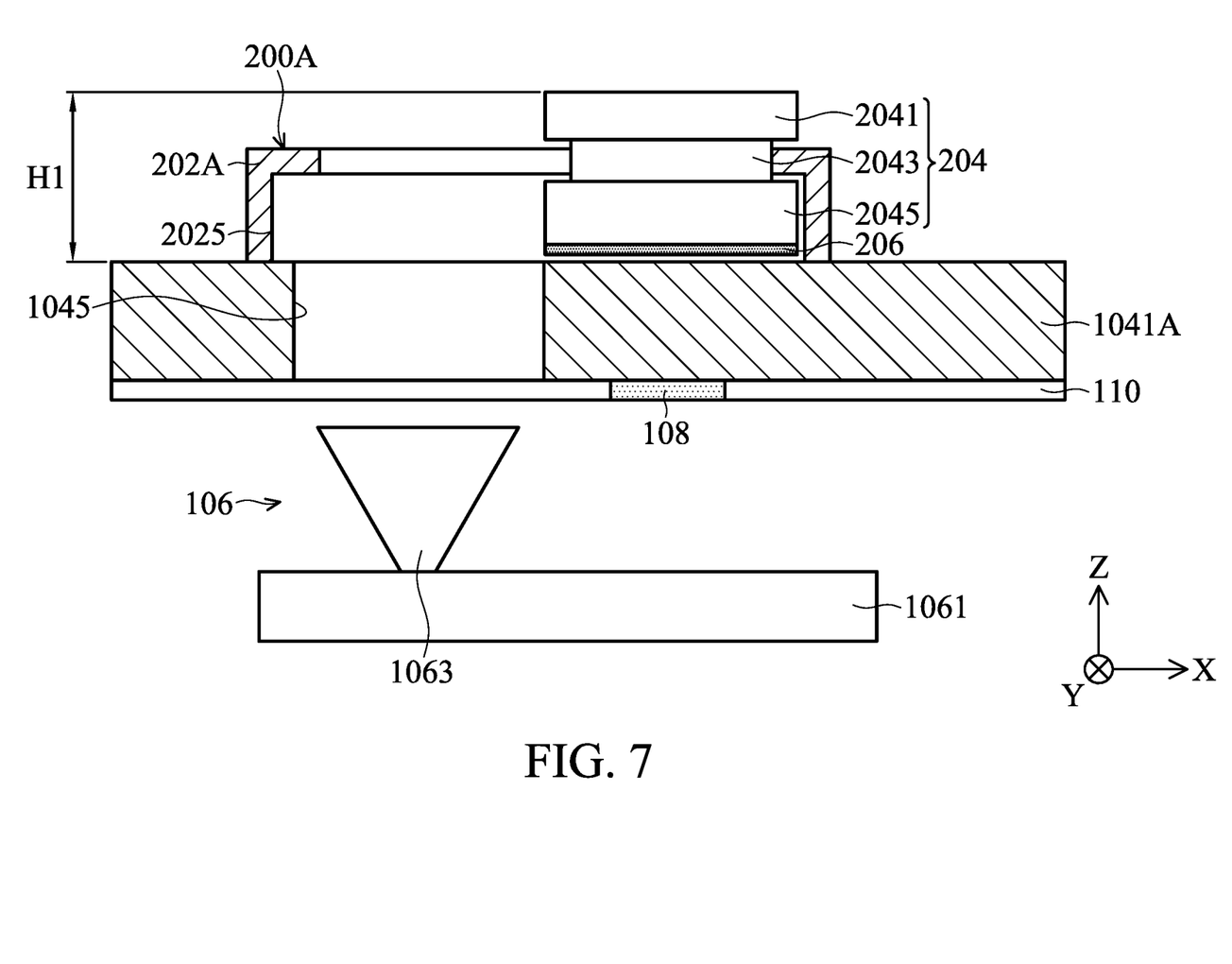
FIG. 7 shows a sectional view of the blocking module, the camera module and the front covering plate according to another embodiment of the present disclosure.

Please refer to FIG. 7, which shows a sectional view of the blocking module 200A, the camera module 106 and the front covering plate 1041A according to another embodiment of the present disclosure. This embodiment is similar to the embodiment of FIG. 6, and the difference between these two embodiments is that the electronic device in this embodiment can further include a conducting layer 110 disposed on the inner side of the front covering plate 1041A. In this embodiment, the front covering plate 1041A can be the topmost glass layer of a touch panel, and the conducting layer 110 can be included in a touch layer of the touch panel. The conducting layer 110 is disposed on the inner side of the front covering plate 1041A and is electrically connected to the monitoring circuit 1021. The type of the touch panel can be GFF, GF, OGS, OGM, GMM, and so on, and the conducting layer 110 can be any one layer in a touch panel of the previous type.

As shown in FIG. 7, the first capacitive sensing element 108 can be formed in the conducting layer 110 and is configured to sense the first conductive element 206. It should be noted that the first capacitive sensing element 108 can be formed in the conducting layer 110. For example, the first capacitive sensing element 108 is directly formed in the conducting layer 110 when manufacturing the display screen 105 and the front covering plate 1041A, so that an additional circuit board is not needed in the structural design of this embodiment. As a result, not only is reduced the manufacturing cost of the electronic device 100, but also the manufacturing process of the electronic device 100 is simplified.

Figure 8A:
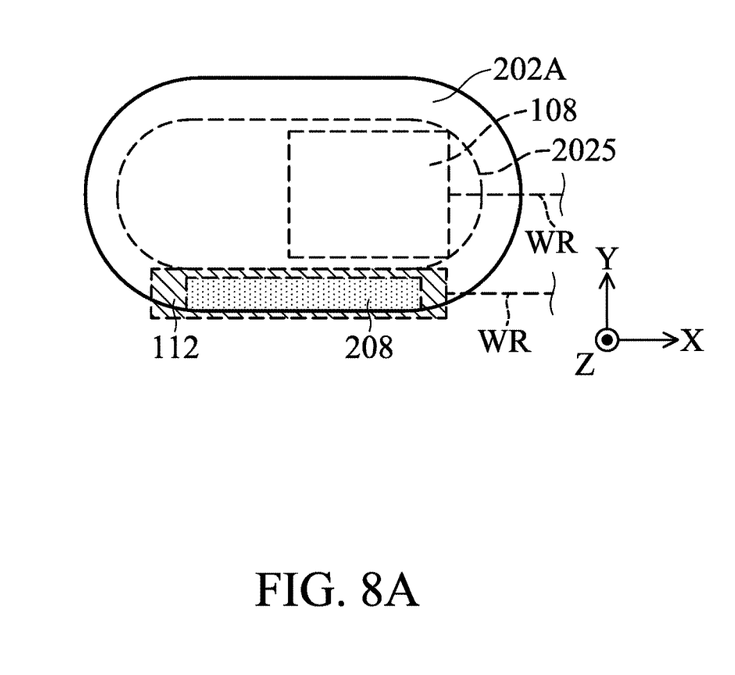
FIG. 8A shows a top view of the base, the first capacitive sensing element and a second capacitive sensing element according to the embodiment of the disclosure.

Please refer to FIG. 8A, which shows a top view of the base, the first capacitive sensing element 108 and a second capacitive sensing element 112 according to the embodiment of the disclosure. In this embodiment, the base can be the base 202A, or also can be the base 202. The moving member 204 and the first conductive element 206 are omitted in FIG. 8A and FIG. 8B for clarity.

As shown in FIG. 8A, the first capacitive sensing element 108 is disposed at the right side of the bottom of the base 202A (corresponding to the first position). In addition, the electronic device can include the second capacitive sensing element 112, disposed below the base 202A along the Z-axis direction. The blocking module 200A further includes a second conductive element 208 corresponding to the second capacitive sensing element 112, and the second conductive element 208 is disposed on the bottom of the base 202A. In this embodiment, the second conductive element 208 has a rectangular structure and is disposed on a long side of the base 202A, and the second capacitive sensing element 112 also has a rectangular structure corresponding to the second conductive element 208. In this embodiment, the first capacitive sensing element 108 and the second capacitive sensing element 112 are electrically connected to the monitoring circuit 1021 through conductive lines WR.

In this embodiment, the second capacitive sensing element 112 is configured to sense the second conductive element 208 and outputs a sensing value, and the monitoring circuit 1021 can receive and monitor the sensing value, so as to determine whether the second capacitive sensing element 112 is aligned with the second conductive element 208. For example, the monitoring circuit 1021 can compare the sensing value with a preset threshold value. When the sensing value is greater than the preset threshold value, the monitoring circuit 1021 determines that the second conductive element 208 is aligned with the second capacitive sensing element 112. That is, the blocking module 200A is aligned with the camera module 106. In contrast, when the sensing value is less than the preset threshold value, the monitoring circuit 1021 determines that the second capacitive sensing element 112 is not aligned with the second conductive element 208.

When the monitoring circuit 1021 determines that the second conductive element 208 is not aligned with the second capacitive sensing element 112, it indicates that the blocking module 200A is not aligned with the camera module 106. Therefore, the monitoring circuit 1021 can control the display screen 105 to display a notification message, such as a dialog window, to notify the user of installing the blocking module 200A onto the front covering plate 1041 again, so as to align the blocking module 200A with the camera module 106.

Figure 8B:
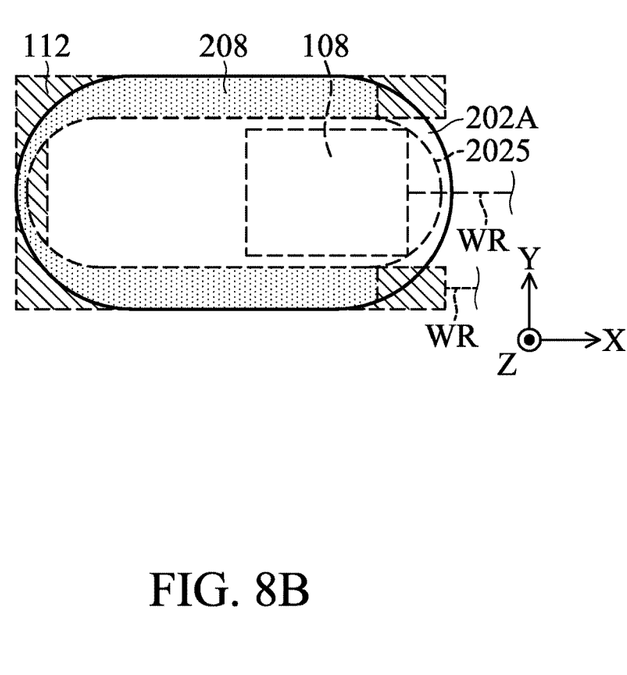
FIG. 8B to FIG. 8D show a top view of the base, the first capacitive sensing element and the second capacitive sensing element according to some embodiments of the disclosure.
Figure 8C:
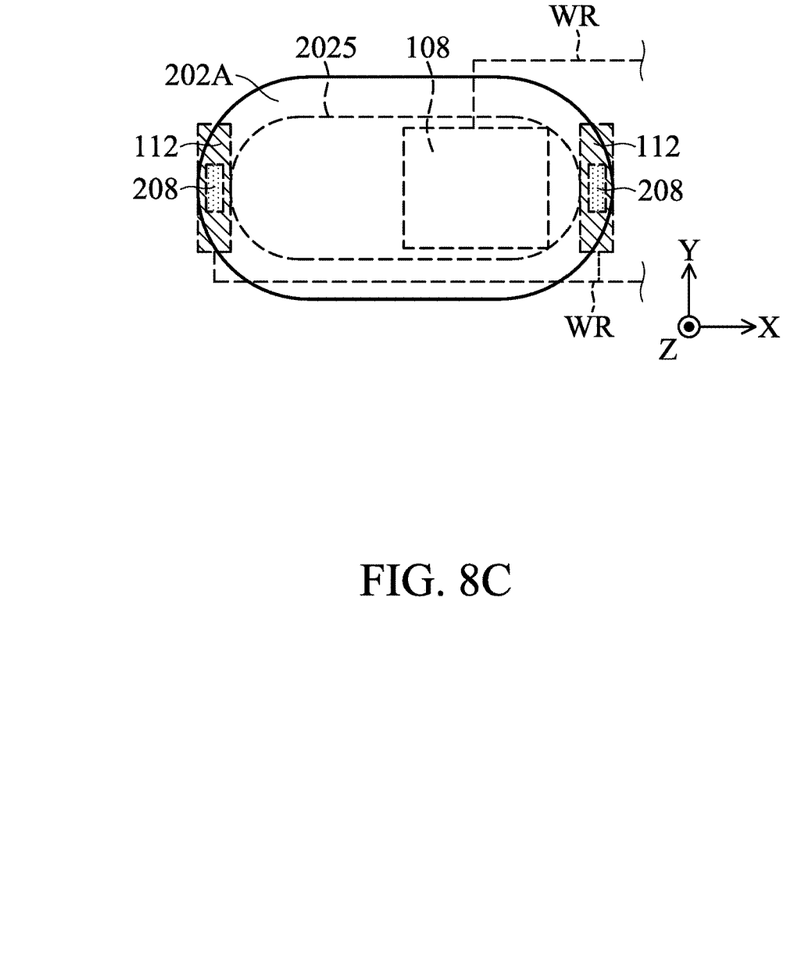
Figure 8D:
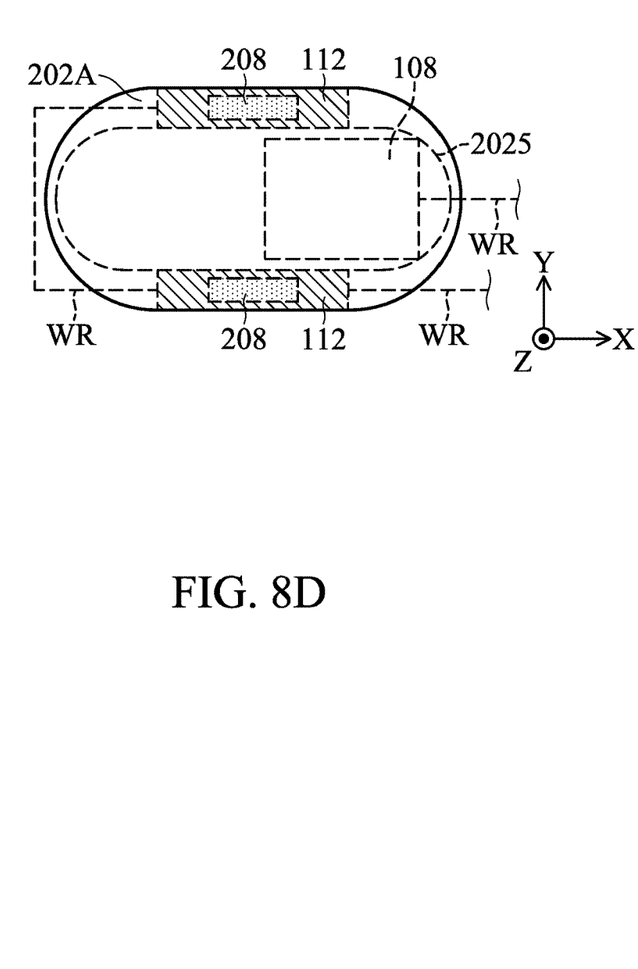

Please refer to FIG. 8B to FIG. 8D, which show a top view of the base, the first capacitive sensing element 108 and the second capacitive sensing element 112 according to some embodiments of the disclosure. As shown in FIG. 8B, the second conductive element 208 has a U-shaped structure corresponding the shape of the base 202A, and the second capacitive sensing element 112 also correspondingly has a U-shaped structure.

In addition, as shown in FIG. 8C and FIG. 8D, there can be two second conductive elements 208 disposed on the bottom of the base 202A, and the electronic device 100 can correspondingly include two second capacitive sensing elements 112. In the embodiment of FIG. 8C, the two second conductive elements 208 are disposed on two short sides of the base 202A, and the two second capacitive sensing elements 112 are correspondingly respectively disposed below the two second conductive elements 208 along the Z-axis direction. In the embodiment of FIG. 8D, the two second conductive elements 208 are disposed on two long sides of the base 202A, and the two second capacitive sensing elements 112 are correspondingly respectively disposed below the two second conductive elements 208 along the Z-axis direction.

Based on the design of the embodiments in FIG. 8B to FIG. 8D, the accuracy of determining whether the base 202A is aligned with the camera module 106 by the monitoring circuit 1021 can be increased.

Figure 9A:
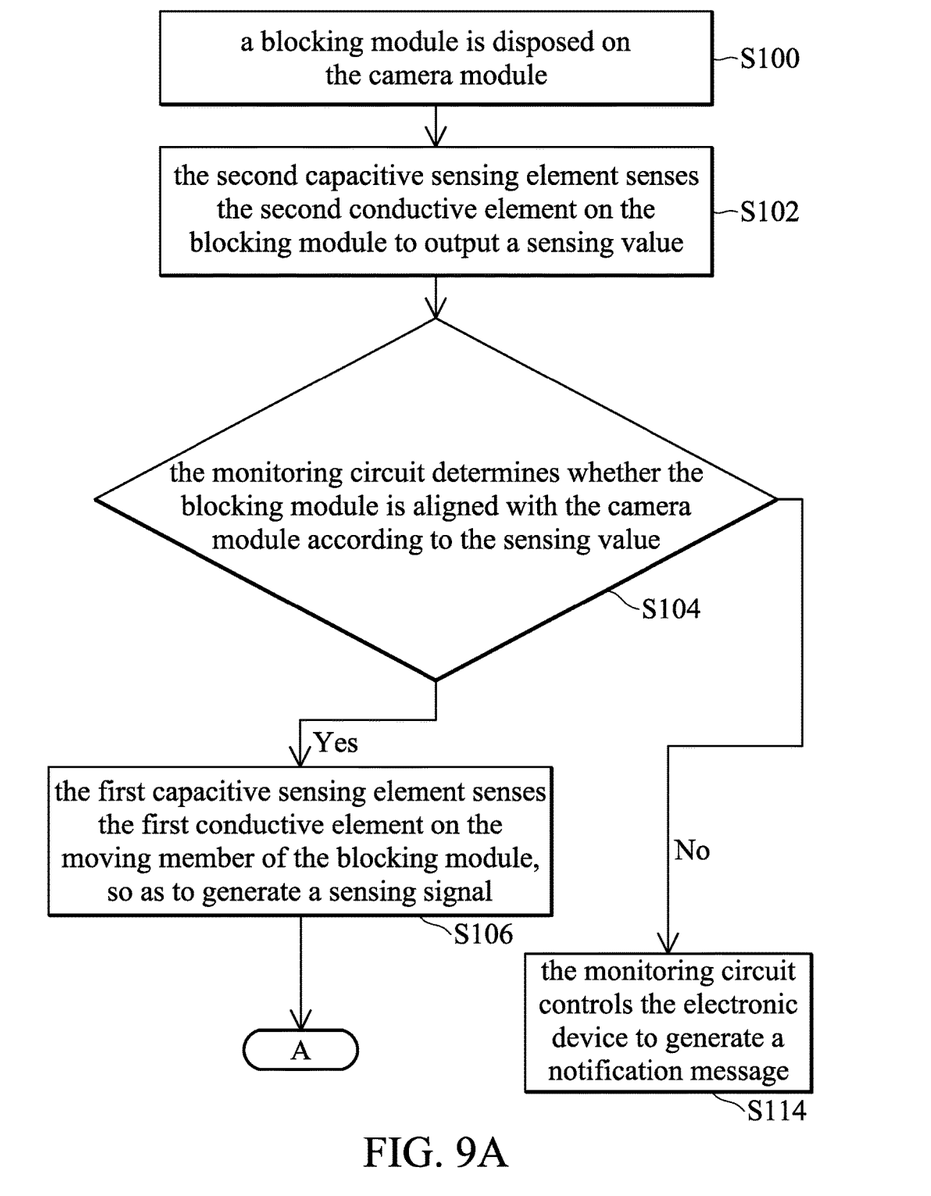
FIGS. 9A and 9B show a flowchart of the method of switching the camera module according to some embodiments of the disclosure.
Figure 9B:
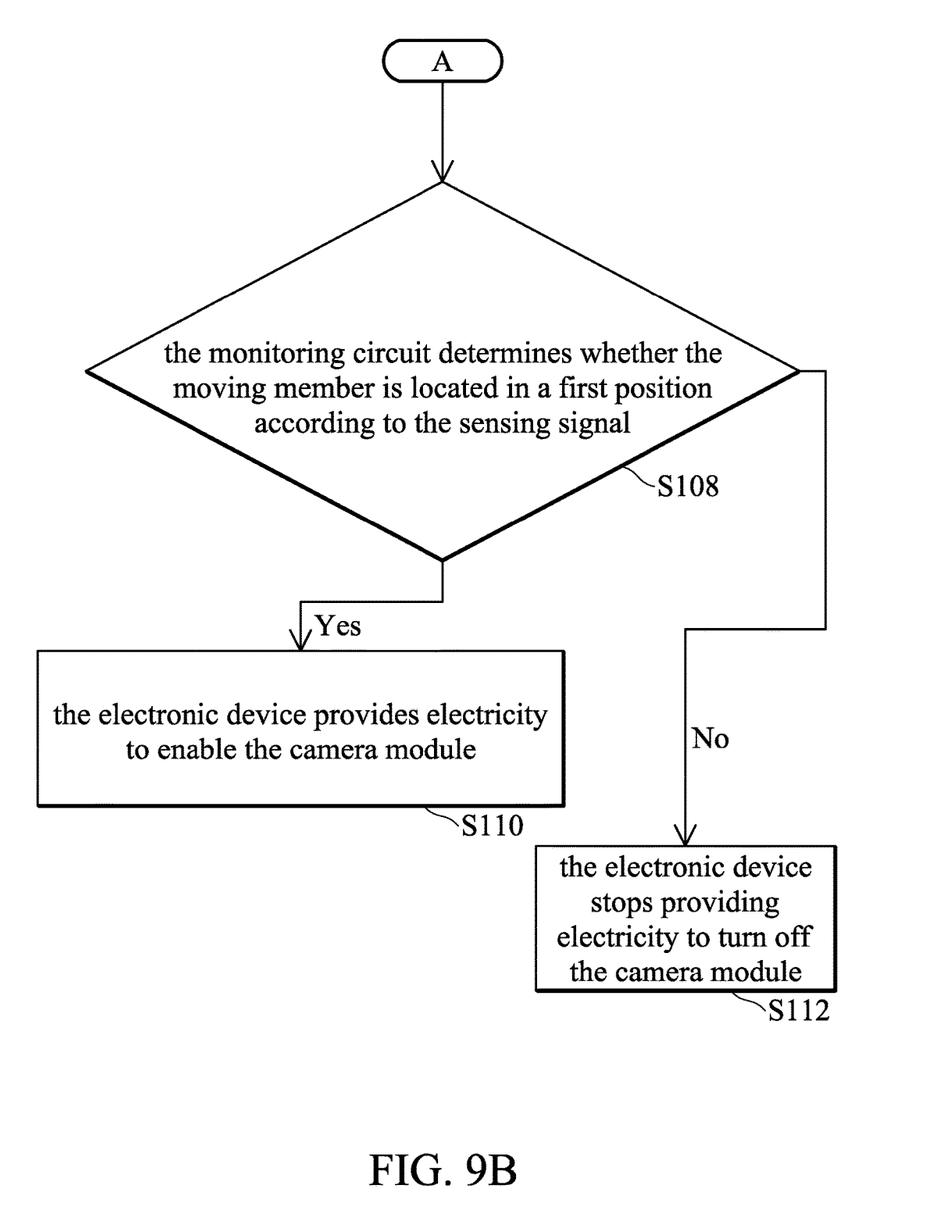

Please refer to FIGS. 9A and 9B, which shows a flowchart of the method of switching the camera module 106 according to some embodiments of the disclosure. In step S100, a blocking module 200 is disposed on the camera module 106 of the electronic device 100. In step S102, when the blocking module 200 is disposed above the camera module 106, a second capacitive sensing element 112 senses the second conductive element 208 on the blocking module 200 to output a sensing value. In step S104, the monitoring circuit 1021 can determine whether the blocking module 200 is aligned with the camera module 106 according to the sensing value. For example, the monitoring circuit 1021 can compare the sensing value with a preset threshold value. When the sensing value is greater than the preset threshold value, the monitoring circuit 1021 determines that the blocking module 200 is aligned with the camera module 106, and step S106 is performed. When the sensing value is less than the preset threshold value, the monitoring circuit 1021 determines that the blocking module 200 is not aligned with the camera module 106, and step S114 is performed.

In step S106, a first capacitive sensing element 108 senses a first conductive element 206 on the moving member 204 of the blocking module 200, so as to generate a sensing signal. Next, in step S108, the monitoring circuit 1021 determines whether the moving member 204 is located in the first position according to the sensing signal. When the moving member 204 is located in the first position, step S110 is performed. When the moving member 204 is located in a second position instead of the first position, step S112 is performed.

In step S110, when the moving member 204 is located in the first position, the electronic device 100 provides the camera module 106 with electricity, so as to enable the camera module 106. In step S112, when the moving member 204 is located in the second position instead of the first position, the electronic device 100 stops providing electricity, so as to turn off the camera module 106, and the moving member 204 blocks a lens 1063 of the camera module 106 at this time.

In step S114, when the monitoring circuit 1021 determines that the blocking module 200 is not aligned with the camera module 106, the monitoring circuit 1021 controls a display screen 105 of the electronic device 100 to show a notification message.

In contrast to the prior art, the present disclosure provides an electronic device 100 which includes a detachable blocking module, and the user can install the blocking module 200 or the blocking module 200A above the camera module 106 of the electronic device 100. The monitoring circuit 1021 can determine whether the moving member 204 of the blocking module 200 blocks the lens 1063 of the camera module 106 according to the sensing signal outputted from the first capacitive sensing element 108 when the first capacitive sensing element 108 senses the first conductive element 206, so as to determine whether to provide the camera module 106 with electricity to enable the camera module 106 or to stop providing electricity to turn off the camera module 106.

In addition, the monitoring circuit 1021 can further determine whether the blocking module 200 is aligned with the camera module 106 according to the sensing value outputted from the second capacitive sensing element 112 when the second capacitive sensing element 112 senses the second conductive element 208. When the blocking module 200 is not aligned with the camera module 106, the monitoring circuit 1021 can control the display screen 105 to display a notification message to notify the user about the installation of the blocking module 200 again, so that the blocking module 200 can be aligned with the camera module 106. As a result, the monitoring circuit 1021 can more accurately monitor the position of the moving member 204.

Therefore, the electronic device 100 having a blocking module can not only solve the problem of hackers hacking into the electronic device 100 and peeping through the camera module 106, but also has the advantage of saving power. In addition, because the first capacitive sensing element 108 and the second capacitive sensing element 112 can be formed together in the touch layer during the manufacturing of the touch panel, the electronic device 100 also has the advantages of reducing the manufacturing cost and simplifying the manufacturing process.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An electronic device comprising:
    a camera module;
    a first capacitive sensing element;
    a monitoring circuit, electrically connected to the first capacitive sensing element and the camera module; and
    a blocking module, comprising:
        a moving member, moving relative to the camera module; and
        a first conductive element, disposed on the moving member;
    wherein when the moving member is located in a first position, the first capacitive sensing element senses the first conductive element and generates a sensing signal, and the monitoring circuit enables the camera module according to the sensing signal, and
    when the moving member is located in a second position and the first capacitive sensing element does not sense the first conductive element, the monitoring circuit turns off the camera module.

2. The electronic device as claimed in claim 1, wherein the blocking module further includes a base, the base includes a sliding slot, and the moving member moves along the sliding slot relative to the base.

3. The electronic device as claimed in claim 2, wherein the base further includes an opening which is aligned with a lens of the camera module, and when the moving member is located in the second position, the moving member blocks the opening.

4. The electronic device as claimed in claim 3, wherein the electronic device further comprises:
    a front covering plate, located between the camera module and the blocking module; and
    a flexible printed circuit board, disposed on the front covering plate, and the first capacitive sensing element being disposed on the flexible printed circuit board.

5. The electronic device as claimed in claim 3, wherein the first capacitive sensing element is disposed on the camera module.

6. The electronic device as claimed in claim 1, wherein the electronic device further comprises a front covering plate, and blocking module further includes a base which includes an opening slot, wherein the moving member moves along the opening slot, and the first conductive element is located between the moving member and the front covering plate.

7. The electronic device as claimed in claim 6, wherein the first capacitive sensing element is disposed on the camera module.

8. The electronic device as claimed in claim 6, wherein the electronic device further comprises a conducting layer, disposed on the front covering plate, and the first capacitive sensing element is disposed in the conducting layer.

9. The electronic device as claimed in claim 1, wherein the electronic device further comprises a second capacitive sensing element, and the blocking module further includes a second conductive element corresponding to the second capacitive sensing element;
    wherein the second capacitive sensing element senses the second conductive element and outputs a sensing value, and the monitoring circuit determines whether the second capacitive sensing element is aligned with the second conductive element according to the sensing value.

10. The electronic device as claimed in claim 9, wherein the blocking module further includes a base, each of the second conductive element and the second capacitive sensing element has a rectangular structure, and the second conductive element is disposed on a long side of a bottom of the base.

11. The electronic device as claimed in claim 9, wherein the blocking module further includes a base, each of the second conductive element and the second capacitive sensing element has a rectangular structure, and the second conductive element is disposed on a short side of a bottom of the base.

12. The electronic device as claimed in claim 9, wherein the blocking module further includes a base, and each of the second conductive element and the second capacitive sensing element has a U-shaped structure which corresponds to a shape of the base.

13. The electronic device as claimed in claim 1, wherein the moving member comprises a first end portion, a connecting portion and a second end portion, the connecting portion is connected between the first end portion and the second end portion, and the first conductive element is disposed on a bottom of the second end portion.

14. The electronic device as claimed in claim 1, wherein the blocking module includes a thickness, and the thickness is substantially equal to 2 mm or is less than 2 mm.

15. The electronic device as claimed in claim 1, wherein the electronic device further comprises a storage circuit, and the monitoring circuit executes an application stored in the storage circuit according to the sensing signal.

16. A method of switching a camera module, comprising:
   disposing a blocking module on the camera module of an electronic device;
   sensing, by a first capacitive sensing element, a first conductive element on a moving member of the blocking module, so as to generate a sensing signal;
   determining, by a monitoring circuit, whether the moving member is located in a first position according to the sensing signal;
   providing, by the electronic device, electricity to enable the camera module when the moving member is located in the first position; and
   stopping providing electricity, by the electronic device, to turn off the camera module when the moving member is located in a second position;
   wherein when the moving member is located in the second position, the moving member blocks a lens of the camera module.

17. The method of switching the camera module as claimed in claim 16, further comprising:
   sensing, by a second capacitive sensing element, a second conductive element on the blocking module to output a sensing value when the blocking module is disposed on the camera module;
   determining, by the monitoring circuit, whether the blocking module is aligned with the camera module according to the sensing value; and
   controlling, by the monitoring circuit, the electronic device to generate a notification message when the monitoring circuit determines that the blocking module is not aligned with the camera module.

\* \* \* \* \*